United States Patent [19]
Borchardt et al.

[11] Patent Number: 6,137,080
[45] Date of Patent: Oct. 24, 2000

[54] SELF-SUPPORTING BATTERY TRAY

[75] Inventors: Ross Borchardt, Fremont; Charles F. Krueger, Neenah, both of Wis.

[73] Assignee: Illinois Tool Works Inc., Glenview, Ill.

[21] Appl. No.: 09/389,512

[22] Filed: Sep. 3, 1999

[51] Int. Cl.$^7$ ...................................................... B23K 9/10
[52] U.S. Cl. ............................ 219/133; 310/89; 361/727
[58] Field of Search ..................................... 219/133, 134; 290/1 A, 16, 27, 28, 50; 361/608, 622, 641, 724, 725, 727; 310/89

[56] References Cited

U.S. PATENT DOCUMENTS

| | | |
|---|---|---|
| 3,289,044 | 11/1966 | Ginsburg . |
| 3,717,805 | 2/1973 | Gnaedinger et al. . |
| 4,939,622 | 7/1990 | Weiss et al. . |
| 5,599,470 | 2/1997 | Peotter et al. . |
| 5,909,935 | 6/1999 | Esperandieu et al. ................... 361/727 |

Primary Examiner—Clifford C. Shaw
Attorney, Agent, or Firm—Mark W. Croll; John P. O'Brien; Donald J. Breh

[57] ABSTRACT

A battery tray for an engine-driven welding machine has two bottom walls separated by a step. When the battery tray is in a closed position, a battery retained on the battery tray is concealed inside the welding machine and the first bottom wall rests on a machine floor. To expose the battery, the battery tray is pulled out an end panel of the welding machine, sliding the first bottom wall on the machine floor until the step is at an outer face of the floor. A slight further pull causes the battery tray to drop the distance of the step such that the second bottom wall contacts the floor. Releasing the battery tray causes flanges on it to abut the machine end panel. The battery tray step and the flanges cooperate with the floor outer face and the machine end panel, respectively, to cantilever support the battery tray outside the welding machine. To return the battery tray to the closed position, it is lifted to pivot it about an angled strip on the second bottom wall until the first bottom wall is higher than the machine floor. Then the battery tray is pushed back to the first position, sliding the first bottom wall on the machine floor.

15 Claims, 4 Drawing Sheets

6,137,080

SELF-SUPPORTING BATTERY TRAY

BACKGROUND OF THE INVENTION

1. Field of the Invention

This invention pertains to engine-driven welding machines, and more particularly to apparatus for servicing the electric storage batteries of engine-driven welding machines.

2. Description of the Prior Art

Electric storage batteries for engine-driven welding machines pose two conflicting requirements. On one hand, the batteries must be protected from the dirt and hard usage of welding environments. On the other hand, the batteries must be easily accessible for servicing when required.

Prior attempts to solve the dual battery requirements on engine-driven welding machines have met with mixed success. One prior way of handling a battery was to place it on an L-shaped bracket that slid in slots along the machine base. A vertical plate on the bracket covered an opening in a wall of the machine. Pulling the bracket from the machine simultaneously uncovered the opening in the machine wall and exposed the battery for servicing. Pushing the bracket back into the machine covered the wall opening and placed the battery safely inside the machine. That prior battery handling design was not entirely satisfactory. In addition to being undesirably expensive, it also permitted the entire bracket and battery to be pulled completely out of the machine such that they could fall on the floor.

U.S. Pat. No. 5,599,470 shows an exemplary battery box for engine-driven welding machines. The battery box of that patent is selectively slidable to expose and conceal the battery. It has the advantage of being positively limited in its sliding motions such that it always remains within the machine base. It is therefore necessarily only to slide the battery box between its two end positions to expose and conceal the battery.

Despite the present availability of different designs for handling engine-driven welding machine batteries, there nevertheless is room for further improvement.

SUMMARY OF THE INVENTION

In accordance with the present invention, a self-supporting battery tray for an engine-driven welding machine is provided that is inexpensive to manufacture and convenient to use. This is accomplished by apparatus that includes a stepped bottom wall that cooperates with flanges to cantilever support the battery tray outside the welding machine.

According to one aspect of the invention, the battery tray bottom wall is made from the bottom walls of two different parts: a box and a support. The battery is secured to the top surface of the box bottom wall. The bottom surface of the box bottom wall is slidable along a floor of the machine. On the front end of the box bottom wall is an upstanding front wall. On the back end of the box bottom wall is a back wall.

The support is attached to the box back wall. The support has a bottom wall with one end that is attached to the box back wall. The support bottom wall is spaced above the box bottom wall by a step. On the opposite end of the support bottom wall as the box is an angled strip.

The flanges are part of the support. They connect to the support bottom wall by a pair of side plates, from which they oppositely extend. The flanges define a vertical plane that is at a controlled distance from the box back wall.

When the battery tray is in a closed position, the battery is concealed inside the machine, the box bottom wall rests on and is in sliding contact with the machine floor, and the box front wall covers an opening in a vertical end panel of the machine. To expose the battery, the battery tray is pulled away from the machine end panel. Doing so slides the box bottom wall along the machine floor to enable the battery to emerge through the opening in the machine end panel. The battery tray is pulled until the box back wall reaches the end of the machine floor. The battery tray drops the distance of the step until the bottom wall of the support contacts and comes to rest on the machine floor. At that point, the support flanges are in close proximity to the machine end panel. Releasing the battery tray allows it to tilt by gravity a small amount until the flanges abut the machine end panel. The reaction forces set up between the battery tray step and the end of the machine floor, and between the battery tray flanges and the machine end panel, result in the battery tray becoming cantilever supported on the machine.

To reclose the battery tray, it is lifted at its front wall. The battery tray pivots on the machine floor about the angled strip of the support. The battery tray is lifted until the box bottom wall is higher than the machine floor. Then the battery tray is pushed into the machine until the box bottom wall adjacent the back wall is over the machine floor. The battery tray is lowered slightly such that the box bottom wall rests on the machine floor. Then the battery tray is pushed all the way into the machine, the box bottom wall sliding along the machine floor, until the box front wall is against and covers the opening in the machine end panel.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
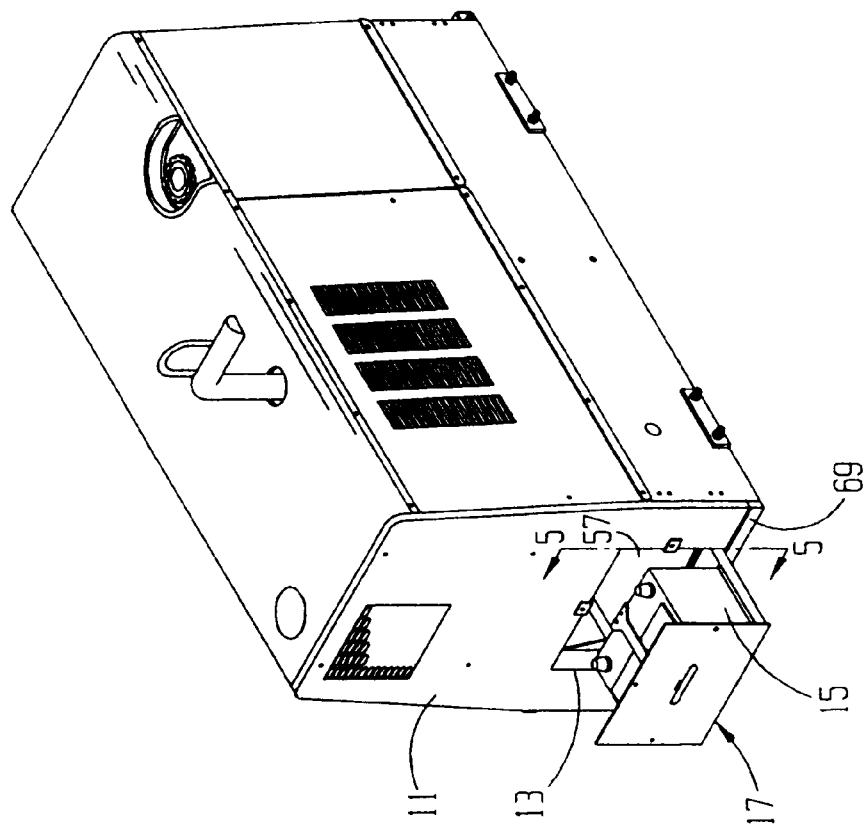
FIG. 1 is a perspective view of an engine-driven welding machine that includes the battery tray of the present invention, the battery tray being shown in a closed position.
Figure 2:
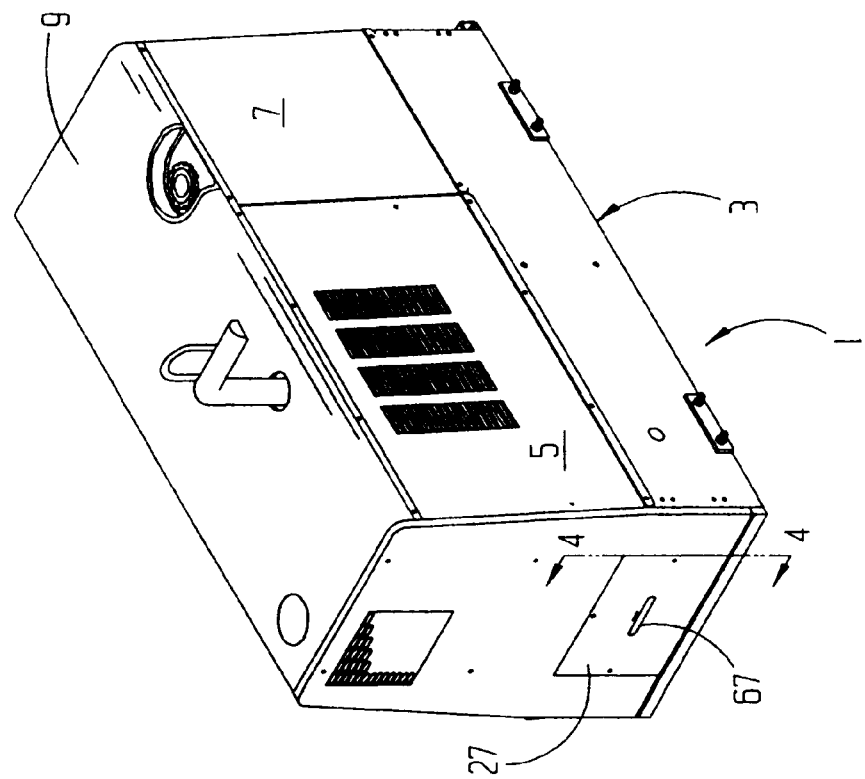
FIG. 2 is a view similar to FIG. 1, but showing the battery tray in an open position.
Figure 3:
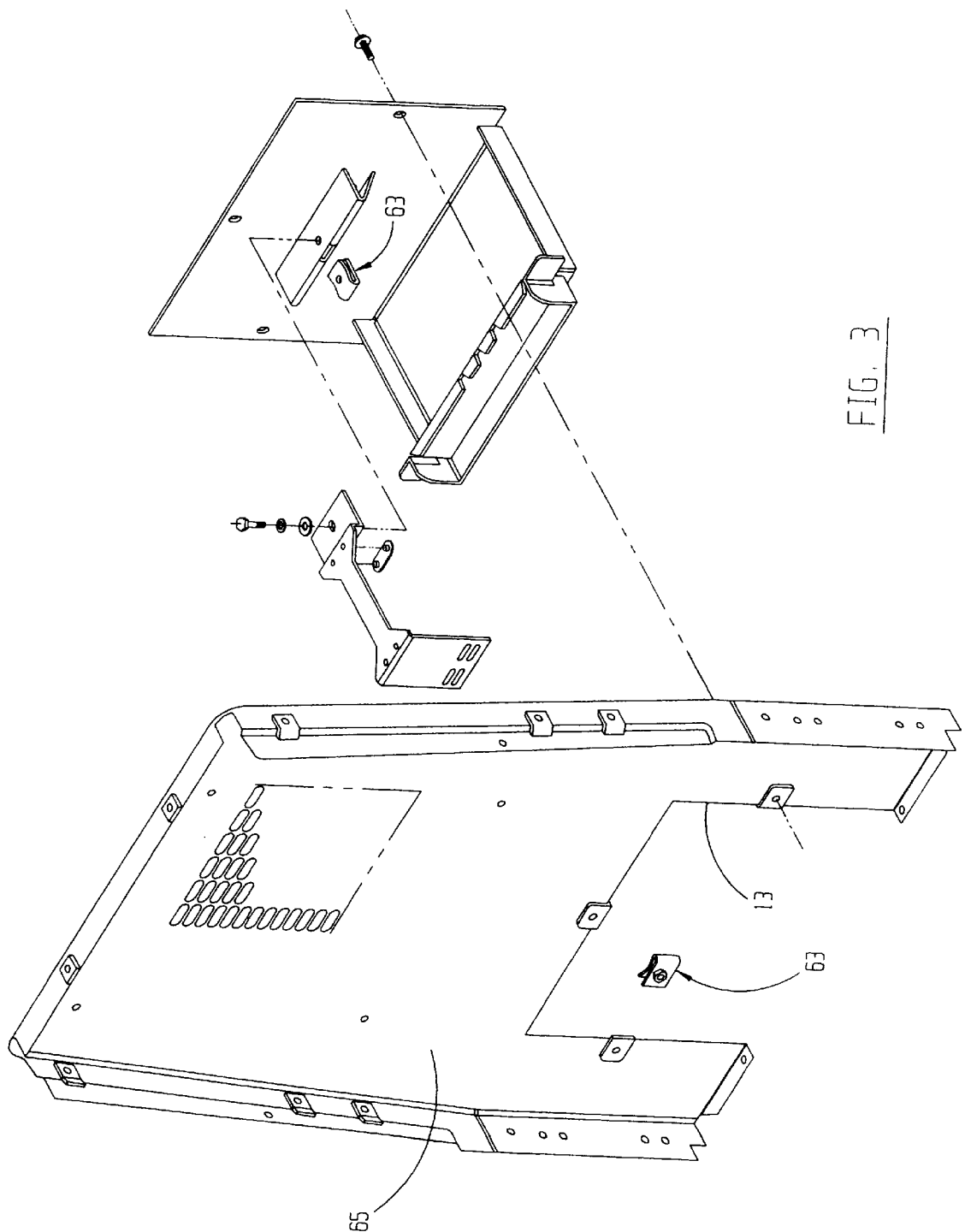
FIG. 3 is an exploded perspective view of the welding machine end panel and the battery tray.

Referring first to FIGS. 1–3, reference numeral 1 indicates a typical engine-driven welding machine that includes the present invention. The particular welding machine 1 shown has a base 3, engine side panels 5, generator side panels 7, and a top panel 9. The base 3 has a horizontal floor 57 that ends in a vertical outer face 69. The welding machine also has a vertical engine end panel 11 that may be generally coplanar with the base outer face 69. The end panel 11 has an inside surface 65 (See FIG. 3) that is at a controlled distance from the outer face 69 of the base floor 57. The end panel has an opening 13 at the machine base 3.

Figure 5:
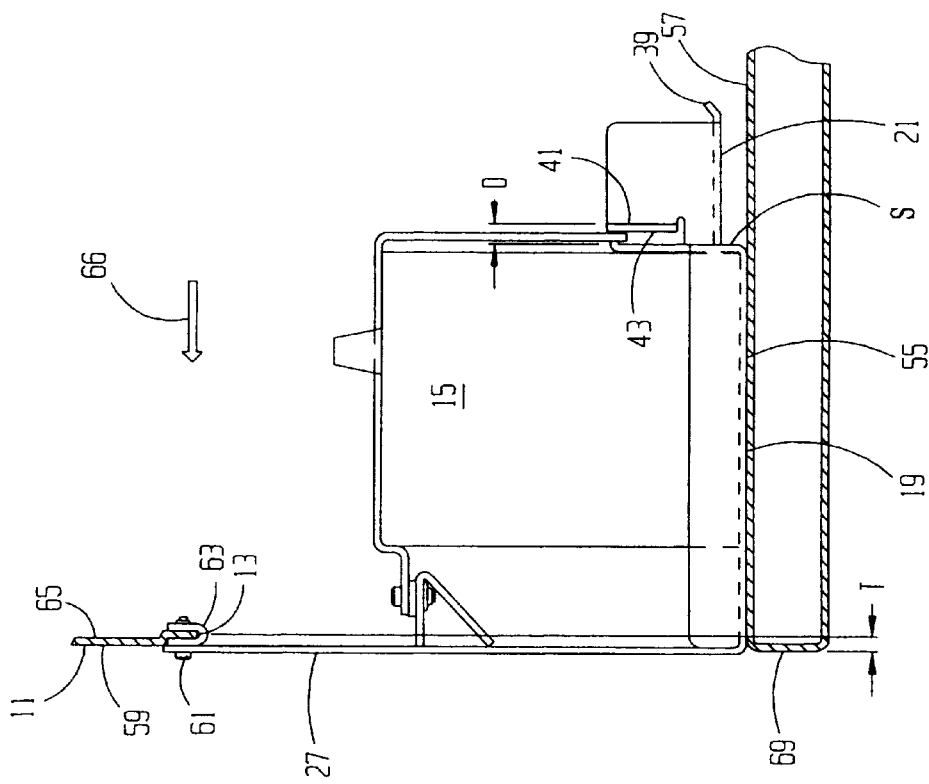
FIG. 5 is a cross-sectional view on an enlarged scale taken along line 5—5 of FIG. 2.

In accordance with the present invention, the electric storage battery 15 for the welding machine engine is selectively concealed inside and exposed outside the machine 1 by a battery tray 17. Looking also at FIGS. 4 and 5, the battery tray 17 has a stepped bottom wall comprising a front bottom wall 19 and a back bottom wall 21. In the preferred embodiment, the front bottom wall 19 is part of a box 23, and the back bottom wall 21 is part of a separate support 25. The box 23 has an upstanding front wall 27, side plates 28, and a back wall 29. The size of the box front wall 27 is larger than the opening 13 in the machine end panel 11. The distance between the box side plates 28 is less than the width of the machine end panel opening. The upper end of the box back wall 29 bends into one or more horizontal tabs 31. On the inside of the box front wall 27 is a bracket 33 having a shelf 35.

The support 25 has two vertical side plates 37 connected to the bottom wall 21. The distance between the side plates 37 is preferably less than the distance between the box side plates 28. The support side plates 37 and at least a portion of the support bottom wall 21 are welded to the box back wall 29. Specifically, the support side plates and bottom wall are welded to the back surface 38 of the box back wall in a manner that creates a step S along the box back wall between the box bottom wall 19 and the support bottom wall. In one preferred embodiment of the invention, the height of the step S is approximately 0.63 inches. The support bottom wall opposite the box back wall is bent upwardly into an angled strip 39.

Extending oppositely from the support side plates 37 are a pair of flanges 41. Each flange 41 has a front face 43. The two flange front faces 43 define a plane that is parallel to the welding machine end panel. The distance D between the flange front faces and the back surface 38 of the box back wall 29 is carefully controlled to be slightly greater than the distance T between the floor outer face 69 and the inside surface 65 of the machine end panel 11. See FIG. 4. In a preferred embodiment, the distance T reflects that the end panel 11 is recessed from the base outer face 69. However, in other embodiments these could be coplanar or stepped the other way provided commensurate changes are made in the distance D.

The battery 15 is placed on the upper surface 45 of the box bottom wall 19. A strap 47 has slots in a first end 49 that receive the tabs 31 on the box back wall 29. A second end 51 of the strap 47 is secured to the box bracket 33 by a fastener 53 which may be threaded into the bracket shelf 35. Preferably, the fastener 53 is threaded into a U-nut 63 that is clipped to the bracket shelf 35. In that manner, the battery is tightly retained in the battery tray 17.

Figure 4:
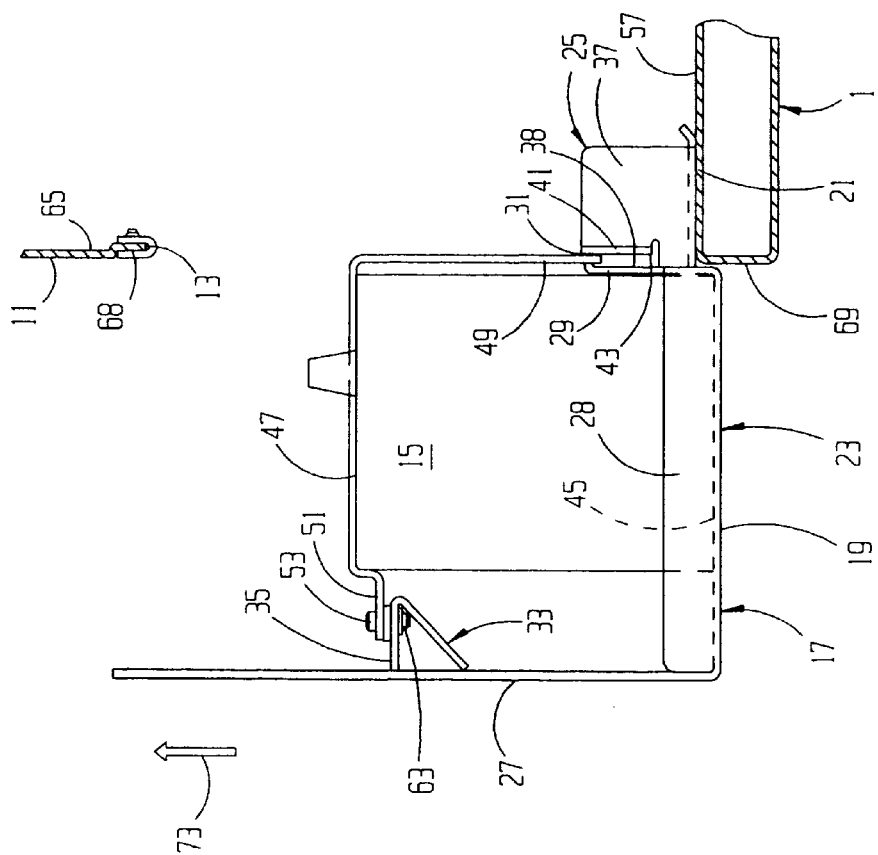
FIG. 4 is a cross-sectional view on an enlarged scale taken along line 4—4 of FIG. 1.

In FIGS. 1 and 4, the battery tray 17 is shown in a closed position. When in the closed position, the bottom surface 55 of the box bottom wall 19 rests on the machine floor 57. The support bottom wall 21 is spaced above the machine floor by the height of the step S. The box front wall 27 is in flat facing contact with the outside surface 59 of the machine end panel 11 and covers the end panel opening 13. The battery tray is held in the closed position by fasteners 61 threaded into nuts 63 on the inside surface 65 of the machine end panel 11. In a preferred embodiment, the nuts 63 are U-nuts clipped into pockets 68 in the end panel 11. When the battery tray is in the closed position, the battery 15 is safely concealed inside the welding machine 1.

To gain access to the battery 15, the fasteners 61 are removed. The battery tray 17 is pulled out of the welding machine 1 in the direction of arrow 66 by means of a finger slot 67 in the box front wall 27. Pulling the battery tray causes the box bottom wall 19 to slide along the machine floor 57. Pulling the battery tray continues until the back surface 38 of the box back wall 29 aligns with the outer face 69 of the machine floor. At that point, the battery tray drops by gravity a distance equal to the height S, which is until the support bottom wall 21 contacts the base floor, FIG. 5. Also at that point, the front surfaces 43 of the support flanges 41 are very close to the inside surface 65 of the machine end panel 11. Releasing the box slot 67 causes the battery tray to become cantilever supported on the machine in an open position. Specifically, the weight of the battery is counteracted by a first reaction force between the box back wall 29 at the step S and the machine outer face 69, and by a second reaction force between the flanges and the machine end panel. The short distance D of the flange faces from the box back wall assures minimal tipping of the battery tray when it is in the open position.

Figure 6:
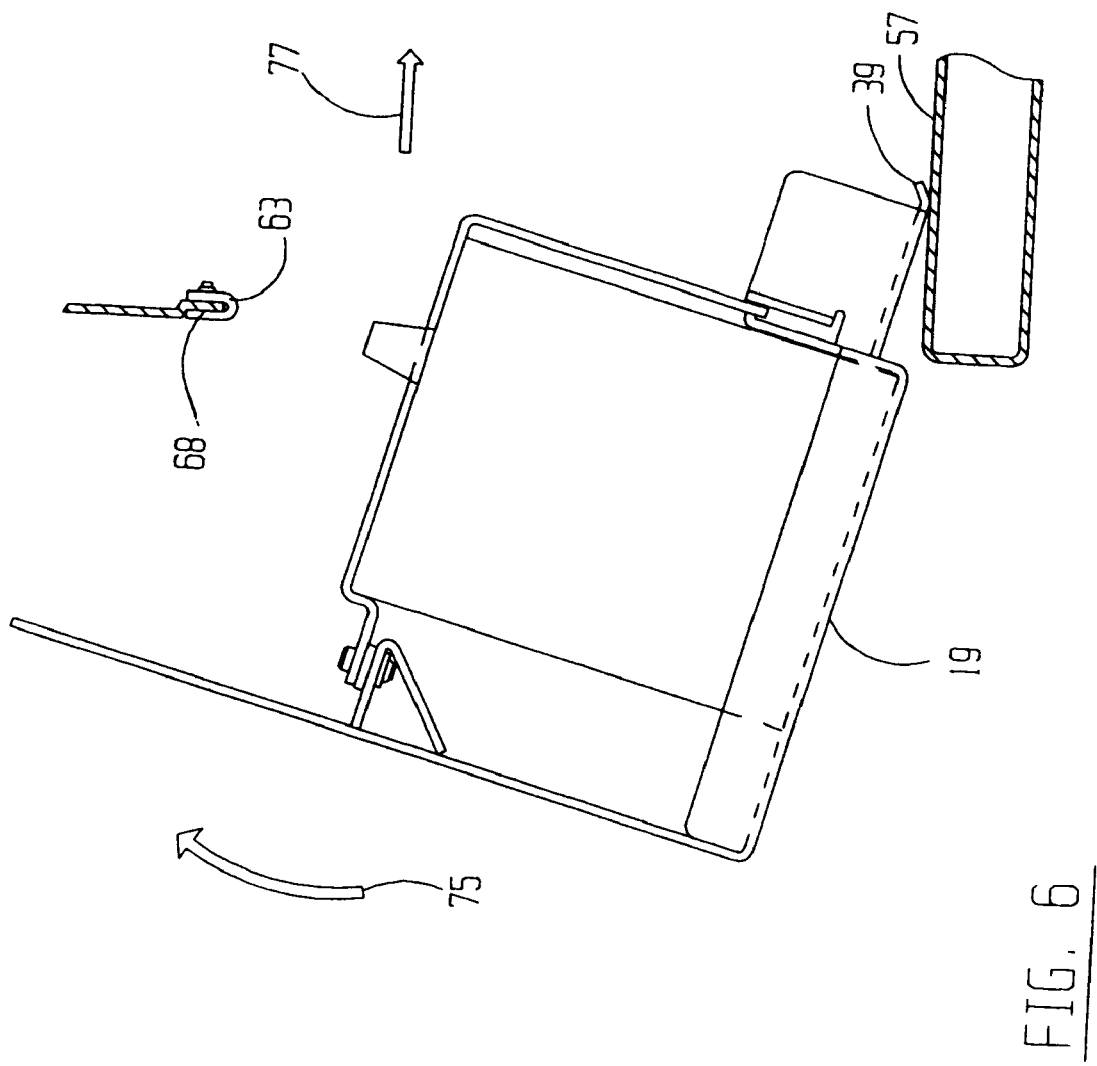
FIG. 6 is a cross-sectional view generally similar to FIG. 5, but showing the battery tray ready to be returned to the closed position.

When the battery 15 is ready to be returned inside the welding machine 1, the battery tray 17 is lifted by the box slot 67 in the direction of arrow 73. Doing so causes the battery tray to pivot above the support angled strip 39 in the direction of arrow 75, FIG. 6. The battery tray is lifted and pivoted until the box bottom wall 19 is higher than the machine floor 57. Then the battery tray is pushed to slide the angled strip along the machine floor in the direction of arrow 77 until the box bottom wall is above the machine floor. The battery tray is lowered until the box bottom wall rests on the floor. Then the battery tray is pushed to the closed position of FIGS. 1 and 4. The screws 61 are replaced, and the welding machine is again ready for operation.

Thus, it is apparent that there has been provided, in accordance with the invention, a self-supporting battery tray that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. In combination with an engine-driven welding machine having a base with a floor that ends in a vertical outer face, and an end panel that is at a first controlled distance from the floor outer face and having an opening therein, a battery tray comprising first and second bottom walls with a step therebetween, a front wall joined to the first bottom wall and being larger than the welding machine end panel opening, and flanges connected to the second bottom wall at a second controlled distance from the step; an electric storage battery; and means for retaining the battery in the battery tray, the battery tray being slidable to a closed position whereat the battery is concealed inside the welding machine, the first bottom wall rests on the machine floor, and the front wall covers the opening in the welding machine end panel, the battery tray being slidable to an open position whereat the battery is exposed outside of the welding machine, the second bottom wall contacts the machine floor, and the flanges abut the machine end panel, the battery tray step and the flanges cooperating with the machine floor outer face and the machine end panel, respectively, to cantilever support the battery tray on the welding machine.

2. The combination of claim 1 wherein:
   a. the first bottom wall and the front wall are part of a box having a back wall upstanding from the first bottom wall; and
   b. the second bottom wall and the flanges are part of a support that is attached to the box back wall.
3. The combination of claim 2 wherein:
   a. the support comprises a pair of side plates upstanding from the second bottom wall; and
   b. the flanges extend oppositely from the side plates.
4. The combination of claim 1 wherein:
   a. the battery tray second bottom wall defines an angled strip; and
   b. the battery tray is pivotable about the angled strip when the battery tray is in the open position to lift the first bottom wall higher than the welding machine floor and enable the battery tray to be returned to the closed position by sliding the first bottom wall along the welding machine floor.
5. The combination of claim 1 wherein the flanges define a plane that is generally parallel to the machine end panel and that is at a controlled distance relative to the step.
6. A battery tray comprising:
   a. a box having a box bottom wall and a front wall, the box being selectively slidable along a horizontal floor between first and second positions, the box bottom wall resting on the floor when the battery tray is in a first position;
   b. a support comprising:
      i. a support bottom wall attached to the box and cooperating with the box bottom wall to define a step therebetween, the support bottom wall contacting the floor when the battery tray is in a second position; and
      ii. a pair of oppositely extending flanges connected to the support bottom wall and defining a vertical plane that is at a controlled distance from the step; and
   c. means for retaining an electric storage battery in the box.
7. The battery tray of claim 6 wherein the battery tray is pivotable about the support bottom wall when the battery tray is in the second position such that the box bottom wall is higher than the floor, and wherein the support bottom wall is slidable on the floor to enable the box bottom wall to be lowered to rest on the floor,
   so that the battery tray can be slid on the floor to the first position.
8. The battery tray of claim 6 wherein:
   a. the box has a back wall upstanding from the ox bottom wall; and
   b. the support bottom wall is attached to the box back wall.
9. The battery tray of claim 8 wherein:
   a. the support bottom wall has a first end that is attached to the box back wall, and a second end that defines the angled strip; and
   b. the battery tray is pivotable about the angled strip when the battery tray is in the second position such that the box bottom wall is higher than the floor, and the angled strip is slidable on the floor to enable the box bottom wall to be lowered to rest on the floor,
   so that the battery tray can be slid on the floor to the first position.
10. A method of selectively concealing and exposing an electric storage battery in an engine-driven welding machine having a floor and an end panel comprising the steps of:
    a. providing a battery tray having oppositely extending flanges, and first and second bottom walls that cooperate to form a step;
    b. retaining the storage battery in the battery tray;
    c. locating the battery tray in a closed position whereat the battery tray first bottom wall rests on the welding machine floor and the battery is concealed inside the welding machine;
    d. pulling the battery tray to an open position whereat the second bottom wall is in contact with the welding machine floor and the battery is exposed outside the welding machine, and simultaneously locating the flanges in close proximity to the welding machine end panel;
    e. releasing the battery tray; and
    f. cantilever supporting the battery tray in the open position on the welding machine.
11. The method of claim 10 wherein the step of providing a battery tray comprises the steps of:
    a. providing a box having the first bottom wall;
    b. providing a support having the second bottom wall and the flanges; and
    c. attaching the support to the box.
12. The method of claim 10 comprising the further steps of:
    a. lifting the battery tray and pivoting it about the second bottom wall when the battery tray is at the open position until the first bottom wall is higher than the welding machine floor;
    b. pushing the battery tray toward the closed position until the first bottom wall is over the welding machine floor;
    c. lowering the battery tray until the first bottom wall rests on the welding machine floor; and
    d. pushing the battery tray to the closed position.
13. The method of claim 12 wherein the step of providing a battery tray comprises the steps of:
    a. providing a box having the first bottom wall;
    b. providing a support having the second bottom wall with first and second ends; and
    c. attaching the support bottom wall first end to the box and forming an angled strip on the support bottom wall second end.
14. The method of claim 10 wherein the step of cantilever supporting the battery tray comprises the steps of producing a first reaction force between the battery tray step and the welding machine floor, and producing a second reaction force between the battery tray flanges and the welding machine end panel.
15. The method of claim 13 wherein:
    a. the step of lifting the battery tray and pivoting it comprises the step of pivoting the battery tray about the angled strip; and
    b. the step of pushing the battery tray toward the closed position comprises the step of sliding the angled strip along the welding machine floor.

* * * * *